United States Patent [19]

Parr

[11] 4,025,600
[45] May 24, 1977

[54] JOINTING OR TERMINATING PLASTICS SHEATHED ELECTRIC CABLES

[75] Inventor: David Turner Parr, Croft, near Warrington, England

[73] Assignee: Bicc Limited, London, England

[22] Filed: May 6, 1976

[21] Appl. No.: 683,957

[30] Foreign Application Priority Data

May 6, 1975 United Kingdom ............ 19015/75

[52] U.S. Cl. .................................. 264/262; 156/49; 156/56; 156/218; 156/304; 264/263; 264/272; 264/275; 264/294; 264/296; 264/328

[51] Int. Cl.² ...................... B29C 5/00; B29D 9/00; B29D 23/08; B29D 23/10

[58] Field of Search ................ 156/48, 49, 53, 304, 156/56, 242, 245, 218, 305; 29/203 S, 527.1–527.4, 628; 264/36, 37, 259, 261, 263, 265, 271, 272, 275, 328, 329, 299, 294, 262

[56] References Cited

UNITED STATES PATENTS

| | | | |
|---|---|---|---|
| 2,144,899 | 1/1939 | Smith | 156/218 |
| 2,355,613 | 8/1944 | Wacker | 264/328 |
| 2,436,984 | 3/1948 | Wilson | 264/263 |
| 2,716,623 | 8/1955 | Tator | 264/263 |
| 2,862,543 | 12/1958 | Kaminsky | 264/263 |
| 3,526,694 | 9/1970 | Lemelson | 264/259 |
| 3,826,702 | 7/1974 | Chapman | 156/218 |
| 3,970,488 | 7/1976 | Nelson | 156/49 |

Primary Examiner—Willard E. Hoag
Attorney, Agent, or Firm—Buell, Blenko & Ziesenheim

[57] ABSTRACT

An enclosure is assembled about an electric cable joint or termination by applying about the cable or cables a plastics sleeve slit therethrough its length and enclosing the adjacent pair of longitudinal edges of the sleeve in a mould which has ports for the admission and discharge of molten thermoplastics material. Molten thermoplastics material that is compatible with the plastics material of the sleeve and that is at a temperature appreciably above the softening point of said material is injected into the mould through at least one port and, after a sufficient quantity of molten thermoplastics material has passed through the mould to soften the surfaces of said longitudinal edges, the molten thermoplastics material in the mould is permitted or caused to cool and make an effective bond between said longitudinal edges. The sleeve is then sealed to adjacent separately formed end parts of the enclosure.

16 Claims, 3 Drawing Figures

JOINTING OR TERMINATING PLASTICS SHEATHED ELECTRIC CABLES

This invention relates to jointing or terminating electric cables and is particularly concerned with electric cable joints or terminations of the kind in which connections between the cable conductors or the terminated end of the or each cable conductor are or is surrounded by a joint or termination enclosure that makes a fluid-tight joint with the sheath, insulation or other covering of each cable connected at the joint or of the or each cable at the termination. The sheath, insulation or other covering of a cable with which an enclosure makes a fluid-tight joint is hereinafter included in the term "sheath".

More particularly, the invention is concerned with electric cable joints and terminations of the aforesaid kind in which the joint or termination enclosure is divided transversely of the axis of at least one of the cables into at least three separately formed parts secured together in a fluid-tight manner, at least one intermediate part of said separately formed parts being of plastics material and comprising a sleeve, such joint or termination enclosures hereinafter being referred to as "of the kind described".

According to the present invention, I provide an improved method of assembling about an electric cable joint or termination an enclosure which is divided transversely of the axis of at least one of the cables into at least three separately formed parts secured together in a fluid-tight manner, at least one intermediate part of the separately formed parts being of plastics material, which method comprises forming the said separately formed intermediate part of the enclosure by applying about the cable or cables a sleeve which comprises a single tubular body that has at least one slit throughout its length bounded by an adjacent pair of longitudinal edges of the sleeve, causing the said adjacent pair of longitudinal edges to lie close together, enclosing said pair of longitudunal edges in a mould which has ports for the admission and discharge of molten thermoplastics material, injecting into the interior of the mould through at least one port molten thermoplastics material that is compatible with the plastics material of the sleeve and that is at a temperature appreciably above the softening point of said material and, after a sufficient quantity of molten thermoplastics material has passed through the mould and out of at least one other port of the mould to soften the surfaces of said longitudinal edges, permitting or causing the molten thermoplastics material in the mould to cool and make an effective bond between said longitudinal edges of the sleeve; and sealing said intermediate part so formed to the adjacent separately formed parts of the enclosure.

Preferably as the thermoplastics material in the mould cools the volume of the space within the mould is reduced, for instance by means of a plunger connected to at least one of the ports in the mould, to compensate for contraction of the thermoplastics material on cooling. In some cases the source of supply can be used for this purpose but preferably the source of supply of molten thermoplastics material is disconnected from the mould before the thermoplastics material in the mould is permitted or caused to cool.

By a plastics material that is compatible with the plastics material of the sleeve is meant a material that will make an effective bond with, and will not have any deleterious effect on, the material of the sleeve, or vica versa. The plastics material may be identical with that of the sleeve.

The method of the present invention is especially, but not exclusively, suitable for use where the addition of one or more than one cable to an existing joint or termination will mean that the enclosure of the existing joint or termination is not of sufficient volume to house all the conductor joints. Generally, but not necessarily, all parts of the enclosure will be removed when the enclosure is opened up and will be replaced by corresponding parts of such a shape and size that the enclosure formed therefrom will be of larger cross-sectional area. An improved method of and apparatus for making a connection between a plastics sheathed cable and a joint between plastics sheathed cables or a termination of a plastics sheathed cable is described and claimed in the Specification of my co-pending U.S. patent application Ser. No. 669,331 filed on the 22nd Mar., 1976.

The sleeve may have at least two slits throughout its length which divide the sleeve longitudinally into at least two separately formed parts and each adjacent pair of longitudinal edges of said parts is bonded together.

Preferably the or each pair of longitudinal edges of the sleeve are chamfered or otherwise shaped to define between them a groove, preferably of substantially V-shaped cross-section.

The sleeve may be applied about the joint or termination or it may be applied about the cable or cables at a position spaced from the joint or termination but, to reduce the risk of damage to the cable joint or termination, preferably the sleeve is applied about the cable or cables and its longitudinal edges are welded together at a position spaced from the joint or termination, the central or intermediate part so formed being subsequently slid over the joint or termination before it is sealed to each adjacent part of the enclosure by any convenient method.

Preferably, the mould comprises an elongate body which has a side face of a shape and configuration complementary to those of that part of the periphery of the sleeve adjacent the or a pair of longitudinal edges, which has in said side face a longitudinally extending groove that will overlie the longitudinal edges throughout the length of the sleeve when the elongate mould is applied to the sleeve, and which has, extending from the longitudinally extending groove to an opposite side face of the mould, ports for the admission and discharge of molten thermoplastics material. Preferably, also, the mould has a plurality of such ports, these ports being provided at spaced positions along the length of the mould. In use, preferably alternate ports are used for admission and discharge of molten thermoplastics material. The elongate mould, which is preferably made of metal or metal alloy or of suitable plastics material, may be secured to the sleeve in any convenient manner but it is preferably secured thereto by a plurality of peripherally continuous clamps applied around the sleeve and mould at spaced positions along their lengths.

To prevent collapse of the sleeve during the injection welding operation, preferably an elongate supporting body is positioned against the internal surface of the sleeve in the vicinity of the or each pair of longitudinal edges and this supporting body is preferably in the form of a substantially rigid tube which has an external diameter approximately equal to the internal diameter of the sleeve and which, for ease of application and removal, is divided longitudinally into two separately formed parts that are detachably secured together, each preferably of substantially semi-circular transverse cross-section. Preferably the elongate mould and the substantially rigid tube are each of such a length that it extends beyond the ends of th sleeve.

Where the molten thermoplastics material that is to be injected into the mould has a relatively low Melt Flow Index, with a view to preventing premature solidifying of the thermoplastics material preferably the surfaces of the mould and the sleeve with which the thermoplastics material is to come into contact are preheated. Preferably such pre-heating is effected by injecting a hot gaseous medium, e.g. air, into the mould, after it has been secured to the sleeve, through one or more than one of the ports.

The invention also includes, for use in the method as hereinbefore described, an elongate mould substantially as hereinbefore described.

The invention wll be further illustrated by a description, by way of example, of the preferred method of assembling a joint enclosure of the kind described about an electric cable joint with reference to the accompanying diagrammatic drawings, in which.

Figure 1:
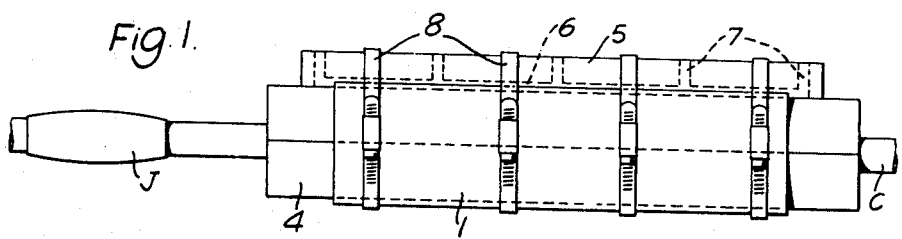
FIG. 1 is a side view of the apparatus employed.
Figure 2:
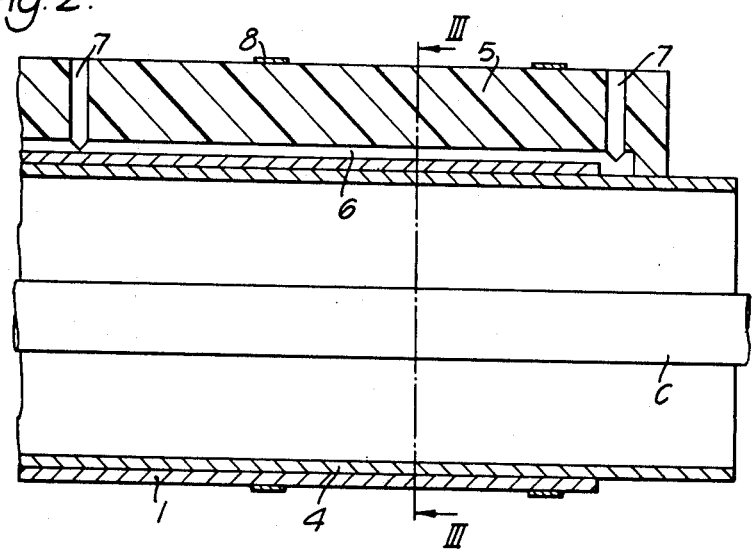
FIG. 2 is a fragmental sectional side view of the apparatus drawn on a larger scale.
Figure 3:
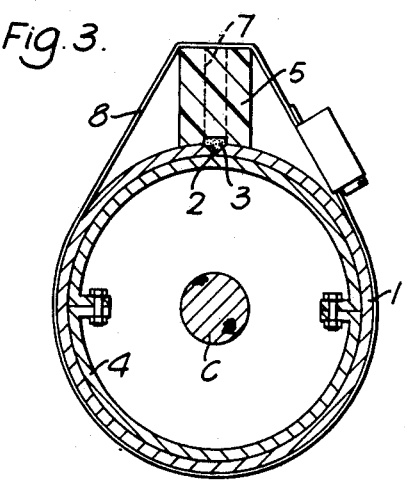
FIG. 3 is a transverse cross-sectional view of the apparatus taken on the line III—III in FIG. 2.

Referring to the drawings, the joint enclosure that is to be assembled about the cable joint J is built up of three separately formed parts, namely two end parts (not shown) and a central part in the form of a sleeve 1. The sleeve 1 is a single tubular body of polyethylene slit throughout its length to form a pair of longitudinal edges 2 which are chamfered to define between them a groove 3 of substantially V-shaped cross-section. The slit sleeve 1 is applied about the cable C at a position spaced from the joint J and a rigid metal tube 4, divided longitudinally into two separately formed parts that are detachably secured together, is positioned inside the sleeve, the external diameter of the tube approximating to the internal diameter of the sleeve.

An elongate mould 5, which has a side face of a shape and configuration complementary to those of that part of the periphery of the sleeve 1 adjacent the pair of longitudinal edges 2, is now positioned on the outside of the sleeve to which it is clamped by clamps 8. The side face of the mould overlying the longitudinal edges 2 of the sleeve 1 has a longitudinally extending groove 6 which, with the groove 3 in the sleeve, defines a mould cavity. Ports 7 extend from the groove 6 to an opposite side face of the mould.

Molten polyethylene that is at a temperature appreciably above its softening point is injected into the mould cavity through aternate ports of the ports 7 and, after a sufficient quantity of molten polyethylene has passed through the mould and out of the other ports of the ports 7 to soften the surfaces of the longitudinal edges 2, the source of supply of molten polyethylene is disconnected and the volume of the space within the mould is reduced by plungers (not shown) connected to some of the ports 7 to compensate for contraction of the polyethylene as it is permitted to cool and make an effective bond between the longitudinal edges of the sleeve. After the sleeve 1 constituting the central part of the enclosure has been so formed, the mould 5 and rigid tube 4 are removed, excess solidified polyethylene at the ends of the sleeve 1 is cut away and the sleeve is moved along the cable to surround the joint J where the separately formed end parts (not shown) of the joint enclosure are sealed to the sleeve and to the cables C by injection welding.

What I claim as my invention is:

1. A method for enclosing an electric cable splice, comprising:

forming a thermoplastic sheet substantially into a tubular sleeve having adjacent edges and disposing said sleeve about said splice, disposing a support member between said splice and said sleeve, said edges of said sleeve being chamfered so that adjacent said edges have a groove therebetween extending longitudinally of said cable, disposing a mold member against said sleeve so as to enclose said groove, while supporting said sleeve internally with said support member injecting a molten thermoplastic material into said mold member and into said groove, said molten material being compatible with the material of said sleeve and at a temperature sufficient to soften said sleeve, and cooling said molten material, thereby forming a bond between said material and said sleeve; removing said support member and sealing at least one separately formed end closure member to said sleeve and to said cable.

2. A method as claimed in claim 1, wherein, as the thermoplastics material in the mould cools, the volumne of the space within the mould is reduced to compensate for contraction of the thermoplastics material on cooling.

3. A method as claimed in claim 2, wherein the volume of the space within the mould is reduced by means of a plunger connected to at least one of the ports in the mould.

4. A method as claimed in claim 1, wherein the source of supply of molten thermoplastics material is disconnected from the mould before the thermoplastics material in the mould cools.

5. The method of claim 1 including joining edges of said sleeve together while said sleeve is axially spaced from said splice and then sliding said sleeve over said splice before sealing said ends about said ends about said cable.

6. A method as claimed in claim 1, wherein the groove defined between the pair of longitudinal edges of the sleeve is of substantially V-shaped cross-section.

7. A method as claimed in claim 1, wherein the sleeve has at least two slits throughout its length which divide the sleeve longitudinally into at least two separately formed parts and bonding each adjacent pair of longitudinal edges of said parts together.

8. A method as claimed in claim 1, wherein the supporting body is a substantially rigid tube which has an external diameter approximately equal to the internal diameter of the sleeve and which is divided longitudinally into two separately formed parts that are detachably secured together.

9. A method as claimed in claim 8, wherein the mould and the substantially rigid tube are each of such a length that it extends beyond the ends of the sleeve.

10. A method as claimed in claim 1, wherein surfaces of the mould and sleeve with which molten thermoplastics material is to come into contact are pre-heated before the molten thermoplastics material is injected into the mould.

11. A method as claimed in claim 10, wherein such pre-heating of said surfaces of the mould and sleeve is effected by injecting a hot gaseous medium into the mould, after it has been secured to the sleeve.

12. The method of claim 1, including passing said thermoplastic material through said mold and permitting said molten material to exit from said mold in sufficient quantity as to soften adjacent said edges.

13. The method of claim 1 including sealing said at least one end member to said sleeve and said cable by injection molding a hardenable material therebetween.

14. A method of assembling about an electric cable portion an enclosure having at least three separately formed parts secured together in a fluid-tight manner, at least one intermediate part of the separately formed parts being of plastics material, which method comprises forming the said separately formed intermediate pair of the enclosure by applying about the cable or cables a sleeve, which comprises a single tubular body that has at least one slit throughout its length bounded by an adjacent pair of longitudinal edges, and a mould, which mould comprises an elongate body that has a side face of a shape and configuration complementary to those of that part of the periphery of the sleeve adjacent said pair of longitudinal edges and that has in said side face a longitudinally extending groove overlying the longitudinal edges through the length of the sleeve and which mould has ports for the admission and discharge of molten thermoplastics material, while supporting said sleeve internally with a support member injecting into the interior of the mould through at least one port molten termoplastics material that is compatible with the plastics material of the sleeve and that is at a temperature appreciably above the softening points of said materials and, after a sufficient quantity of molten thermoplastics material has passed through the mould and out of at least one other port of the mould to soften the surfaces of said longitudinal edges, cooling the molten thermoplastics material in the mould, thereby forming an effective bond between said longitudinal edges of the sleeve; removing said support member and sealing at least one separately formed end closure member to said sleeve and to said cable.

15. A method as claimed in claim 1, wherein the elongate mould has a pluralilty of ports at spaced positions along the length of the mould that extend from the longitudinally extending groove to an opposite side face of the mould and wherein alternate ports are used for admission and discharge of molten thermoplastics material.

16. A method as claimed in claim 1, wherein the elongate mould is secured to the sleeve by a plurality of peripherally continuous clamps applied around the sleeve and mould at spaced positions along their lengths.

* * * * *

UNITED STATES PATENT OFFICE
CERTIFICATE OF CORRECTION

Patent No. 4,025,600          Dated  May 24, 1977

Inventor(s) DAVID TURNER PARR

It is certified that error appears in the above-identified patent and that said Letters Patent are hereby corrected as shown below:

In the Abstract, line 3, "therethrough" should read --throughout--.

Column 1, line 41, "longitudunal" should read --longitudinal--.

Column 3, line 8, "th" should read --the--.

Column 3, line 58, "aternate" should read --alternate--.

Column 5, line 20, Claim 14, "pair" should read --part--.

Signed and Sealed this

Sixth Day of September 1977

[SEAL]

Attest:

RUTH C. MASON
Attesting Officer

LUTRELLE F. PARKER
Acting Commissioner of Patents and Trademarks